(12) United States Patent
Jeon

(10) Patent No.: US 7,817,054 B2
(45) Date of Patent: Oct. 19, 2010

(54) METHOD OF CONTROLLING OPERATIONS AND ELECTRONIC DEVICE IMPLEMENTING THE SAME

(75) Inventor: Soo-Jin Jeon, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 444 days.

(21) Appl. No.: 11/925,701

(22) Filed: Oct. 26, 2007

(65) Prior Publication Data

US 2008/0100437 A1    May 1, 2008

(30) Foreign Application Priority Data

Oct. 27, 2006    (KR) .................. 10-2006-0104831

(51) Int. Cl.
  *G08B 21/00*  (2006.01)
  *G04B 1/00*   (2006.01)
  *G04C 3/00*   (2006.01)

(52) U.S. Cl. .............................. 340/636.19; 368/204

(58) Field of Classification Search ... 340/636.1–636.2, 340/636.19; 368/9, 11, 12, 71–73, 185, 187, 368/203, 204, 243, 244, 249
See application file for complete search history.

(56) References Cited

U.S. PATENT DOCUMENTS

| | | | | |
|---|---|---|---|---|
| 5,663,711 | A * | 9/1997 | Sanders et al. | 340/635 |
| 5,712,690 | A * | 1/1998 | Kim | 348/570 |
| 7,304,563 | B2 * | 12/2007 | Chipchase | 340/309.16 |
| 2009/0143114 | A1 * | 6/2009 | Vargas et al. | 455/574 |

* cited by examiner

*Primary Examiner*—Jennifer Mehmood
(74) *Attorney, Agent, or Firm*—Lee, Hong, Degerman, Kang & Waimey

(57) ABSTRACT

An electronic device having several alarm functions checks to see if a first alarm type can be executed at a preset time, and if not, executes a second alarm type. The alarm types may be playing a received broadcast, playing a stored multimedia file, sounding a tone, or vibrating. If playing a received broadcast is selected as the first alarm type and playing an MP3 file is selected as the second alarm type, and when at the preset time, the broadcast cannot be received, then the MP3 file will be played.

15 Claims, 4 Drawing Sheets

METHOD OF CONTROLLING OPERATIONS AND ELECTRONIC DEVICE IMPLEMENTING THE SAME

CROSS REFERENCE TO RELATED APPLICATION

This application claims the benefit of the Korean Patent Application No. 10-2006-0104831 filed on Oct. 27, 2006, which is hereby incorporated by reference as if fully set forth herein.

FIELD OF THE INVENTION

The present invention relates to an electronic device, and more particularly, to a method of controlling operations of the electronic device. Although the present invention is suitable for a wide scope of applications, it is particularly suitable for various electronic devices.

DISCUSSION OF THE RELATED ART

Generally, advances in electronics have allowed the development and manufacture of electronic devices having multiple functions in a single device, and such devices have become ubiquitous in daily life. For example, many communication terminals, PDA's, video and audio recorders have multiple functions such as voice and data communication, image and video recording, and audio and video reproduction.

For instance, time, video and audio playback, internet access functions are added to mobile communication terminals such as mobile phones and PDAs to provide various functions in a single device.

Therefore, if one of the functions fails to work normally, it is necessary that the failed function be compensated by the rest of the functions of the electronic device.

SUMMARY

Accordingly, the present invention is directed to a method of controlling operations of an electronic device that substantially obviate one or more problems due to limitations and disadvantages of the related art.

An object of the present invention is to execute a secondary function when a primary function is unavailable in a multi-functional electronic device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling an alarm function of an electronic device includes setting an alarm time for execution of the alarm function, selecting a first alarm type from a menu of alarm types, selecting a second alarm type from the menu of alarm types, executing the first alarm type at the alarm time if the first alarm type is operable, and executing the second alarm type at the alarm time if the first alarm type is not operable.

In another aspect of the present invention, an electronic device includes an input unit configured to receive an alarm time and to select a first alarm type and a second alarm type from a menu of alarm functions, a time unit for generating the current time, a memory unit for storing the alarm function, an alarm generating unit, and a control unit configured to execute the first alarm type at the alarm time if the first alarm type is operable, and to execute the second alarm type at the alarm time if the first alarm type is not operable.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE INVENTION

Reference will now be made in detail to the present invention, examples of which are illustrated in the accompanying drawings. Wherever possible, the same reference numbers will be used throughout the drawings to refer to the same or like parts.

The present invention is applicable to an electronic device in which various functions are unified into one. In particular, the present invention is applicable to an electronic device capable of performing an alarm function at a specific or preset time.

For convenience of explanation, it is assumed that the electronic device is a mobile terminal, a PDA (personal digital assistant), or a PMP (portable multimedia player). However, the present invention is applicable to various video/audio devices including a TV, an audio player as well as a mobile terminal. The present invention is not limited to the following explanation and implementations.

Figure 1:
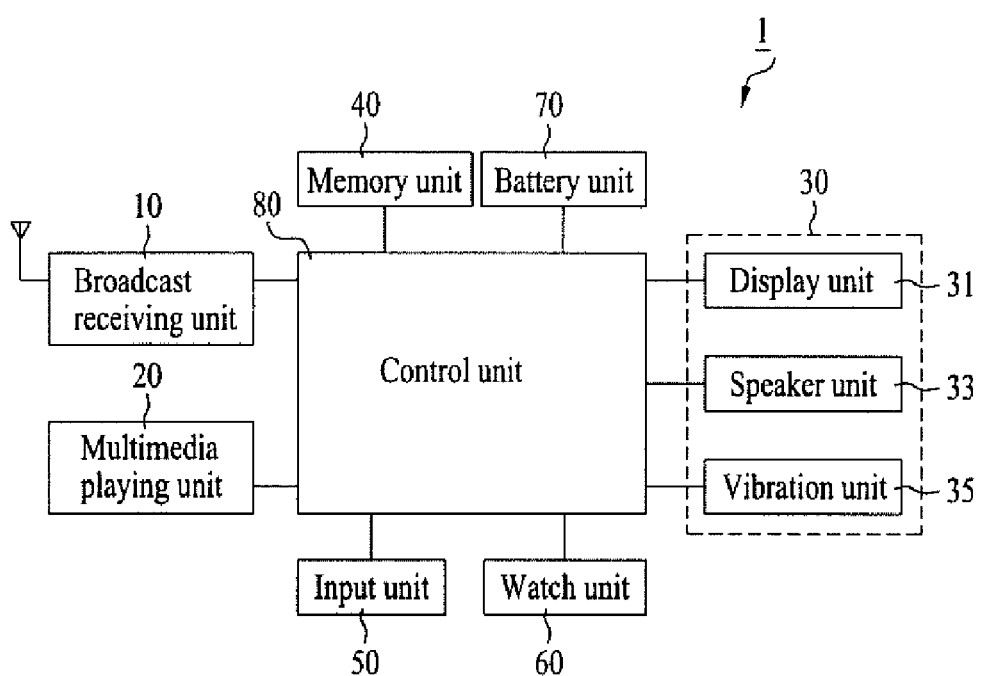
FIG. 1 is a schematic block diagram of a general concept for a mobile terminal according to the present invention.

A configuration of a mobile terminal 1 according to the present invention is explained with reference to FIG. 1. FIG. 1 is a schematic block diagram of a mobile terminal according to the present invention, wherein the mobile terminal includes a broadcast receiving unit 10, a multimedia playing unit 20, an alarm generating unit 30, a memory unit 40, an input unit 50, a watch unit 60, a battery unit 70 and a control unit 80. Other elements may be included in the mobile terminal according to the present invention. Detailed explanations for other elements will be omitted in the following description since they are not directly associated with the present invention.

The broadcast receiving unit 10 receives various broadcasts of terrestrial DTV, satellite DTV and the like as well as mobile broadcasting such as MediaFlo in U.S.A., DMB (digital multimedia broadcasting) in Korea, DVB-H in EU, etc. If the received broadcast is used as an alarm in the present invention, the broadcast receiving unit 10 is necessary, otherwise the broadcast receiving unit 10 may be omitted.

The multimedia playing unit 20 reproduces video and/or audio multimedia contents stored in the memory unit 40. If the multimedia content is used as an alarm in the present invention, the multimedia playing unit 20 is necessary, otherwise, the multimedia playing unit 20 may be omitted.

The alarm generating unit 30 preferably includes at least one of a display unit 31, a speaker unit 33, and a vibration unit 35. For instance, if a broadcast or video content is used as an alarm, the alarm generating unit 30 includes the display unit 31 and the speaker unit 33. If MP3 music or a tone is used as an alarm, the speaker unit 30 is included in the alarm generating unit 30. If vibration is used as an alarm, the vibration unit 35 is included in the alarm generating unit 30.

The memory unit 40 stores various software and corresponding data for the various functions provided by the mobile terminal 1. In particular, if the mobile terminal 1 includes the multimedia playing unit 20, the memory unit 40 is able to store various multimedia content (e.g., video files, MO3 files, etc.) for multimedia playback.

The input unit 50 enables a terminal user to input various commands or information to the mobile terminal 1. There is no limitation of the type of the input unit 50. In particular, an input module such as a keypad or a touch-screen can be used as the input unit 50.

The watch unit 60 provides the current time, either by maintaining the current time internally or receiving an external timing source. For example, a base station communicating with a network provides a mobile phone with the current time. An example of an internal timing source is a digital timer, examples of which are well known in the art.

The battery unit 70 supplies power to the mobile terminal 1. If an external power source is used to supply power to the mobile terminal 1, the battery unit 70 may be omitted.

The control unit 80 controls the broadcast receiving unit 10, the multimedia playing unit 20, the alarm generating unit 30, the memory unit 40, the input unit 50, the watch unit 60 and the battery unit 70 enabling the operation of the broadcast receiving terminal 1.

Figure 2:
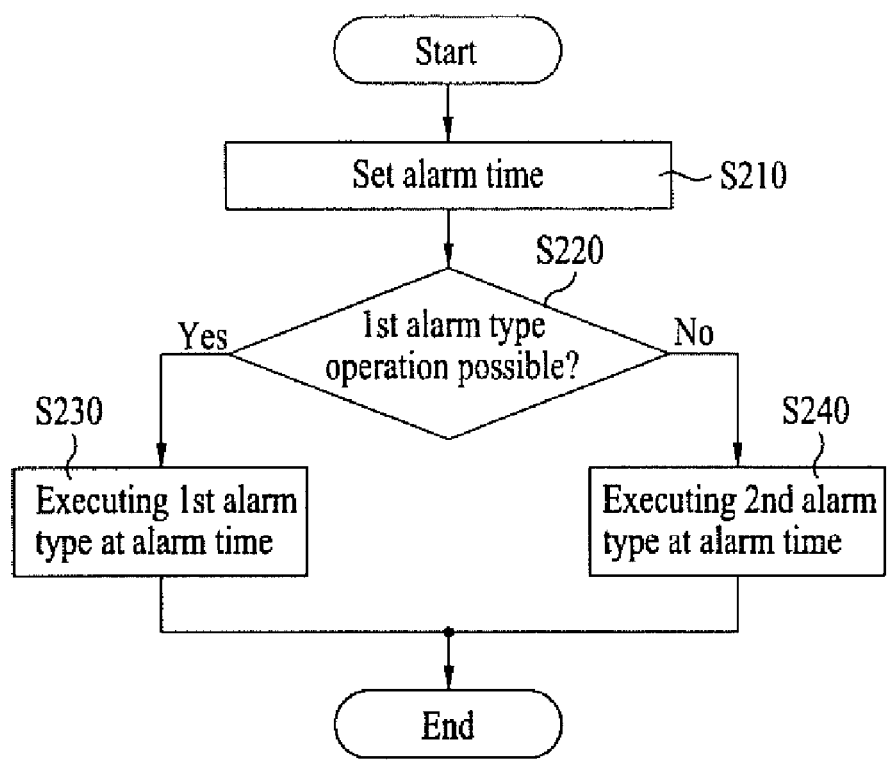
FIG. 2 is a flowchart showing method of controlling operations according to the present invention.

FIG. 2 is a schematic overall flowchart of a method for controlling operations of an electronic device according to the present invention. The mobile terminal 1 according to the present invention is able to provide a user with different types of alarms. For instance, the alarm types include a playing a received broadcast, playing a stored multimedia such as an MP3 or a video, sounding a tone such as a bell sound, and vibrating.

A user sets an alarm time and a first and a second alarm type to be activated at the alarm time [S210]. If the first alarm type cannot be activated at the alarm time because of an internal or external factor, the terminal is configured to activate the second alarm type [S220, S230, S2401.

Figure 3:
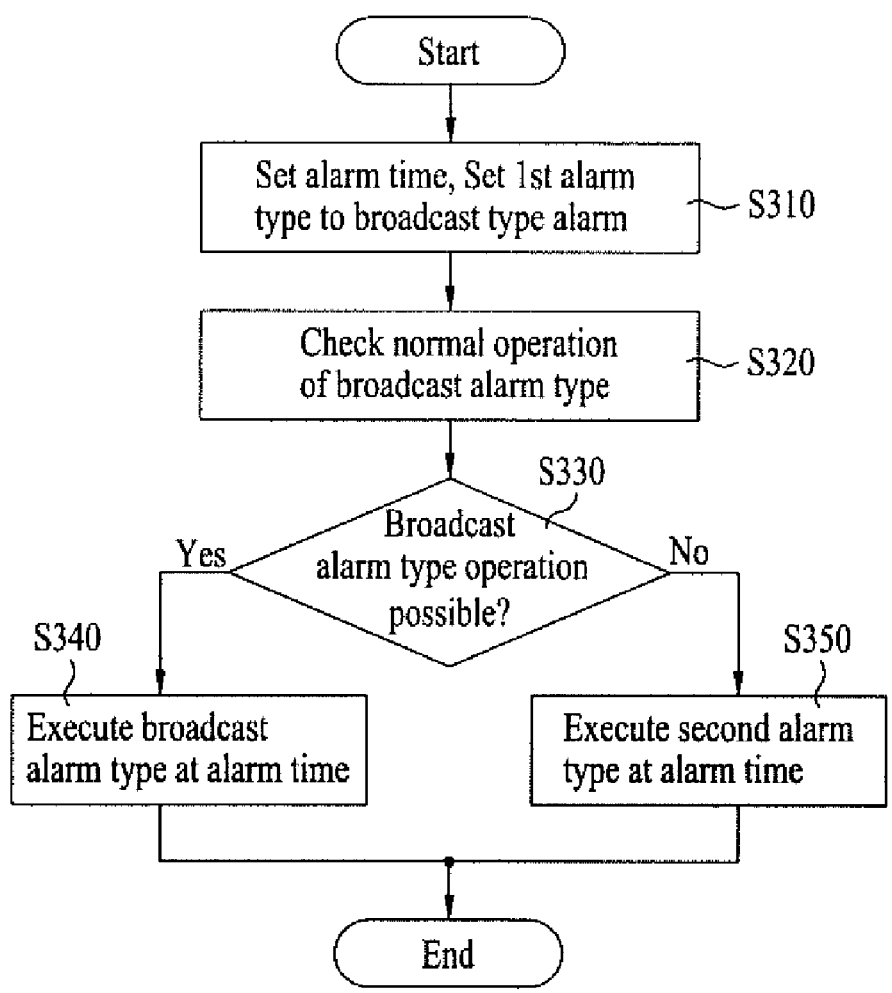
FIG. 3 is a flowchart showing another method of controlling operations according to the present invention.

FIG. 3 is a flowchart of a method of controlling operations according to one aspect of the present invention, namely where the first alarm type depends upon receiving a broadcast. A user sets an alarm time in the mobile terminal 1, and sets the first alarm type to a broadcast alarm type. [S310]. The setup for the alarm time and the first alarm type may be performed each time or can be stored in memory for future use.

Subsequently, the mobile terminal 1 checks whether the broadcast alarm type can be normally operated. [S320]. If a broadcast signal intensity is such that the broadcast cannot be reliably received and played at the alarm time, the terminal determines that the first alarm type is not possible. This check can be performed immediately prior to the alarm time or at another predetermined time.

If the first alarm type is possible at the alarm time, the mobile terminal executes the broadcast alarm type at the alarm time. [S330, S340]. However, if the first alarm type cannot be executed, the terminal executes the second alarm type at the alarm time [S330, S340]. In this case, the second alarm type is an alarm type different that the first alarm type such as a multimedia alarm type, a tone alarm type. Although not shown in FIG. 3, the second alarm type can be previously set to a specific alarm type by a user. Alternatively, the second alarm type can be set to a specific alarm type (e.g., bell sound alarm type) as a default value.

Even if the mobile terminal 1 is unable to execute the broadcast alarm type at the alarm time, the mobile terminal 1 executes a different alarm type at the alarm time.

Figure 4:
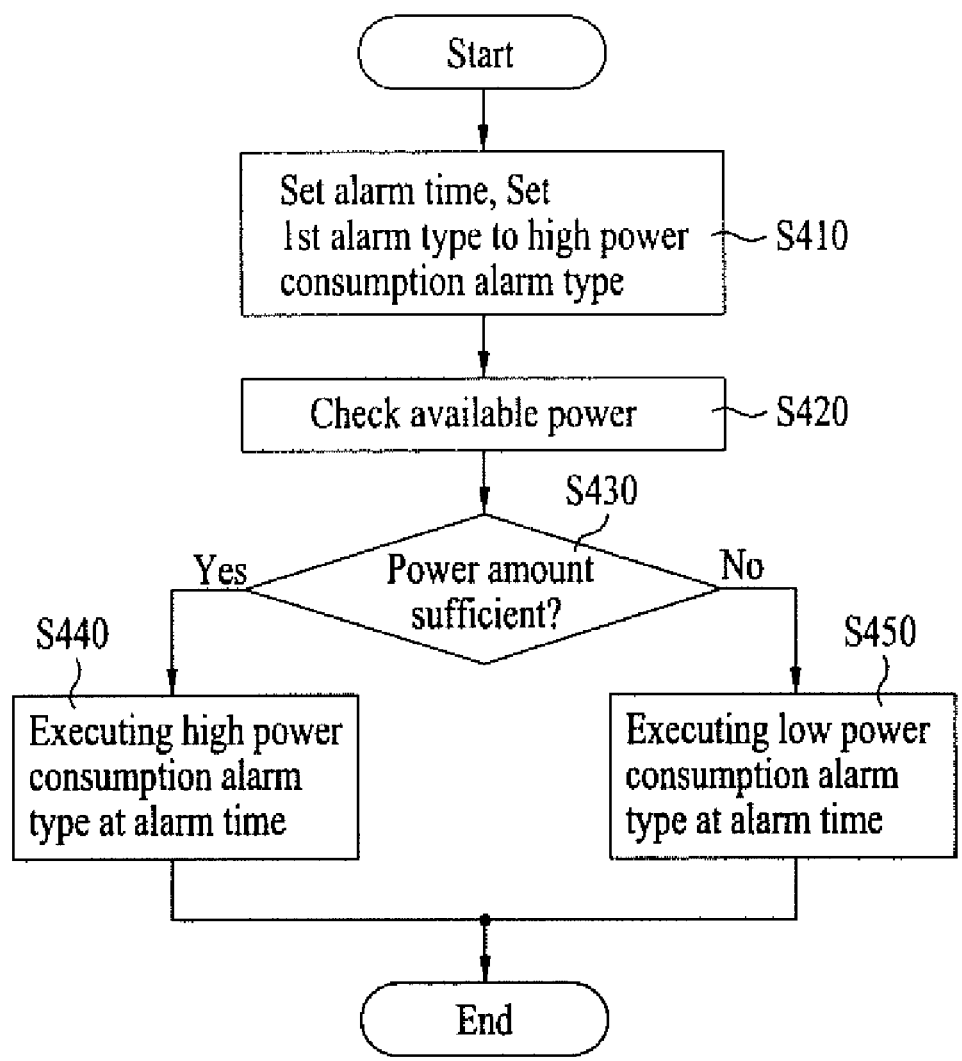
FIG. 4 is a flowchart showing a further method of controlling operations according to the present invention.

FIG. 4 is a flowchart of a method of controlling operations according to another aspect of the present invention, namely where the first alarm type may not be executed because of low power. The power consumption of the broadcast, the multimedia, and the vibration alarm types is relatively higher than that of the tone alarm type, and the power consumptions of each of the alarms types differ.

Similar to the first aspect of the invention, two different alarm types, i.e., first and second alarm types are considered. In this case, the power consumption of the first alarm type (e.g., multimedia alarm type) is higher than that of the second alarm type (tone alarm type). In the following description, the first and second alarm types are named a high power consumption alarm type and a low power consumption alarm type, respectively.

Referring now to FIG. 4, a user sets a first alarm type to a high power consumption alarm type. [S410]. The setup for the alarm time and the first alarm type may be performed each time or can be stored in memory for future use, The mobile terminal 1 checks the power level remaining in the battery 70 [S420] and determines whether there is sufficient power to execute the high power consumption alarm type [S430]. If power is supplied to the mobile terminal 1 from an external power source (not shown in the drawing, e.g., constant power from a vehicle cigar jack), the check can be performed in a manner of checking whether a power amount from the external power source is sufficient and stable. The power check may be conducted right before the alarm time (i.e., substantially same time of the alarm time) or at a prescribed time (e.g., several seconds to several minutes) prior to the alarm time.

If there is sufficient power, the mobile terminal 1 executes the high power consumption alarm type at the alarm time. [S430, S4401. However, if there is insufficient power to execute the high power consumption alarm type, the mobile terminal executes the low power consumption alarm type at the alarm time. [S430, S4501.

Although not shown in FIG. 4, the second alarm type can be previously set to a specific alarm type by a user. Alternatively, the second alarm type can be set to a specific alarm type (e.g., tone alarm) as a default.

Therefore, if the mobile terminal 1 is unable to activate the high power consumption alarm type at the alarm time, the mobile terminal 1 activates the low power consumption alarm type to enhance the user's convenience.

Generally, the first alarm type is replaced by the second alarm type in case that the first alarm type is unable to operate. For instance, if a broadcast alarm type is set in a folder type mobile terminal, the terminal is checked whether it is open or closed at the alarm time. If the folder is closed, only the audio portion is played back. Hence, battery power can be conserved.

Accordingly, the present invention provides the following advantage. If a function cannot operate in an electronic device, that function can be replaced by another function. Hence, inconvenience to a user caused by the unavailability of a function within the electronic device can be minimized.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling an alarm function of an electronic device, the method comprising:
   setting an alarm time for execution of the alarm function;
   selecting a first alarm type from a menu of alarm types;
   selecting a second alarm type from the menu of alarm types;
   executing the first alarm type at the alarm time if the first alarm type is operable; and
   executing the second alarm type at the alarm time if the first alarm type is not operable,
   wherein the electronic device is provided with a broadcast receiving function for receiving a broadcast signal, and
   wherein the first alarm type is related to the broadcast receiving function and is not operable when the broadcast signal is abnormal.

2. The method of claim 1, wherein the first alarm type is playing a video broadcast or playing a radio broadcast.

3. The method of claim 1, wherein the first alarm type is playing a radio broadcast.

4. The method of claim 1, wherein the first alarm type has high power consumption and the second alarm type has low power consumption.

5. The method of claim 4, further comprising:
   measuring a battery power level;
   executing the first alarm type at the alarm time if the battery power level is greater than or equal to a preset value; and
   executing the second alarm type at the alarm time if the battery power level is less than the preset value.

6. The method of claim 1, wherein the menu of alarm types comprises playing a video broadcast, playing a radio broadcast, playing a multimedia file, playing a sound file, generating an audible signal, generating a visual signal, and generating a vibrating signal.

7. The method of claim 1, wherein the first alarm type is different from the second alarm type.

8. An electronic device having an alarm function, the device comprising:
   an input unit configured to receive an alarm time and to select a first alarm type and a second alarm type from a menu of alarm functions;
   a time unit for generating a current time;
   a memory unit for storing the alarm function;
   an alarm generating unit;
   a broadcast receiving unit configured to receive a broadcast signal; and
   a control unit configured to execute the first alarm type at the alarm time if the first alarm type is operable and to execute the second alarm type at the alarm time if the first alarm type is not operable,
   wherein the first alarm type is related to a broadcast receiving function and is not operable when the broadcast signal is abnormal.

9. The device of claim 8, wherein the first alarm type is playing a video broadcast.

10. The device of claim 8, wherein the first alarm type is playing a radio broadcast.

11. The device of claim 8, wherein the first alarm type has high power consumption and the second alarm type has low power consumption.

12. The device of claim 11 further comprising a battery.

13. The device of claim 12, wherein the control unit is further configured to:
   measure a power level of the battery; and
   execute the first alarm type at the alarm time if the battery power level is greater than or equal to a preset value and execute the second alarm type at the alarm time if the battery power level is less than to the preset value.

14. The device of claim 8, wherein the menu of alarm types comprises playing a video broadcast, playing a radio broadcast, playing a multimedia file, playing a sound file, generating an audible signal, generating a visual signal, and generating a vibrating signal.

15. The device of claim 8, wherein the first alarm type is different from the second alarm type.

* * * * *